Aug. 1, 1967 S. H. GOWARD 3,333,325
METHOD OF ATTACHING END FITTINGS TO HOSES
Filed April 1, 1963 2 Sheets-Sheet 1
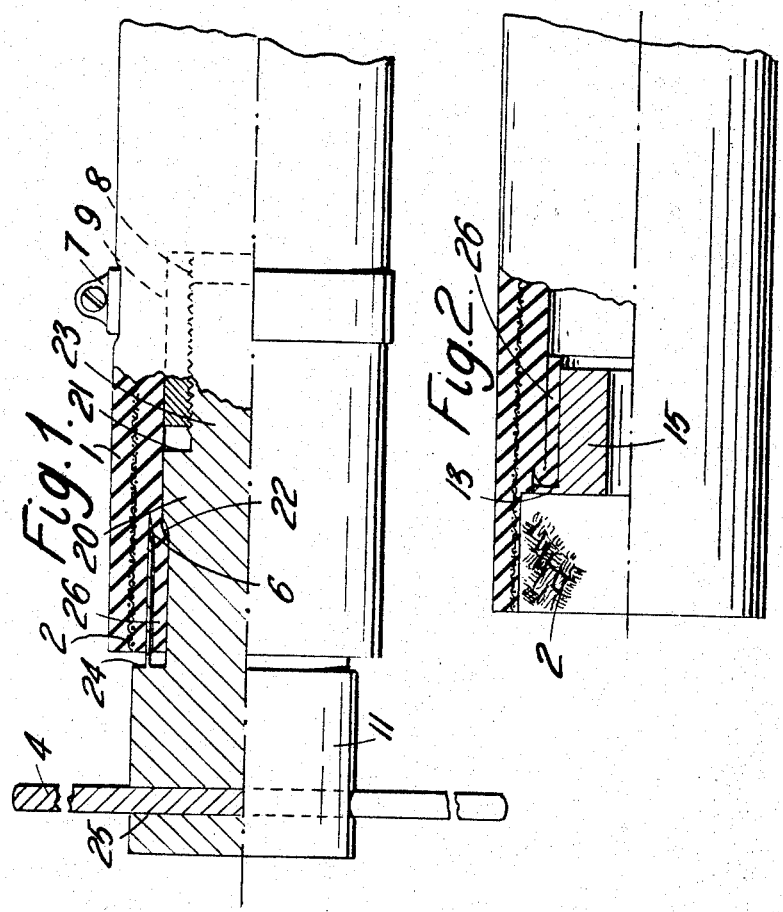
INVENTOR
Stanley H. Goward
By Watson, Cole, Grindle & Watson
ATTORNEYS

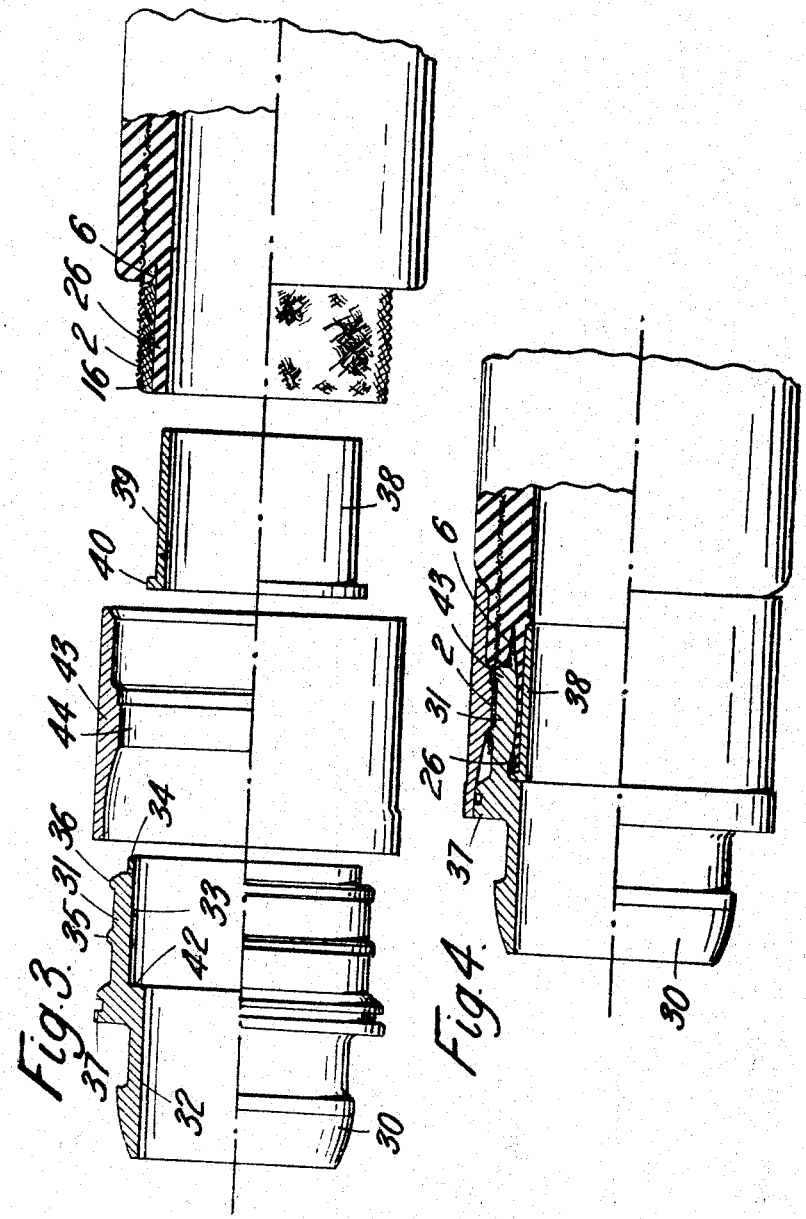

United States Patent Office 3,333,325
Patented Aug. 1, 1967

3,333,325
METHOD OF ATTACHING END FITTINGS TO HOSES
Stanley Harold Goward, Weybridge, Surrey, England, assignor to BTR Industries Limited, London, England, a British company
Filed Apr. 1, 1963, Ser. No. 269,409
Claims priority, application Great Britain, Apr. 6, 1962, 13,432/62
8 Claims. (Cl. 29—508)

The invention relates to the attachment of end fittings to hoses and in particular to such attachments in which a portion of one end of a hose engages with the inside of an end fitting to form a lip seal.

The invention provides a method of preparing a hose of elastomeric material for the reception of an end fitting which method comprises forming a tubular slot in the end of the hose by the steps of forming a cylindrical slit in one end wall of the hose, which slit extends into the hose in the axial direction and divides the wall of the hose into inner and outer tubular parts, turning back inside the hose the inner tubular part and removing a layer of material from the inside of the outer tubular part, and returning the inner part to its original position.

Preferably the hose comprises an inner tube of elastomeric material and around the tube a layer of braided or woven reinforcement and in which the slit is formed within the thickness of the wall of the inner tube to divide the hose into two coaxial tubular parts and in which the portion of the inner tube between the slit and the reinforcement is removed to produce the slot.

The hose may have an outer layer of elastomeric material around the reinforcement.

The step of cutting the slit in the hose may be accomplished by the use of a cutter which comprises a tubular cutting blade and, within the cutting blade and spaced away therefrom, a cylindrical spigot extending towards the hose which spigot enters the hose ahead of the cutting blade and makes engagement with the inner wall of the hose.

In one embodiment in which the step of cutting the slit in the hose is accomplished by the use of a cutter having a cutting blade and in which a screw-threaded member is inserted into the bore of the hose and is clamped thereto, the cutter makes screw threaded engagement with the member to draw the cutter into the hose when the cutter is rotated and thereby to cut the slit.

The method may include the step of attaching to the hose an end fitting having a tubular extension which fits into the tubular slot by clamping one part of the hose between the tubular extension and a metal sleeve.

More specifically the hose is attached to the end fitting by placing the extension of the end fitting in the slot removing at least an end portion of the outer layer to expose the reinforcement, placing an outer tubular sleeve around the outside of the exposed reinforcement and at least a part of the end fitting and swaging the outer sleeve to the end fitting, to grip the reinforcement against the fitting. Preferably the method includes the step of inserting an inner sleeve into the hose within the inner part aforesaid and, by the swaging operation on the outer sleeve, also swaging the extension to grip the inner hose part against the inner sleeve.

The invention also provides the combination of a hose embodying elastomeric material with an end fitting in which the end fitting has a tubular extension towards the hose, one end wall of the hose has a tubular slot formed by removal of part of the wall of the hose and into which the said extension fits and the hose is clamped between the tubular extension and a metal sleeve.

Preferably the hose comprises a tube of elastomeric material and around the tube a layer of braided or woven reinforcement, the slot is formed by cutting away the part of the inner tube adjacent the reinforcement to bare the reinforcement and the reinforcement is swaged between an outer sleeve and the tubular extension.

A specific example of a method according to the invention of attaching an end fitting to a hose will now be described with reference to the accompanying drawings in which:

FIGURE 1 is a part sectional view showing a slit being formed in the hose,

FIGURE 2 is a part sectional view showing the slot being formed in the hose,

FIGURE 3 is an exploded part sectional view showing the hose ready for the reception of an end fitting and the parts of the end fitting, and FIGURE 4 is a part sectional view of the end fitting attached to the hose.

The hose in this example comprises an inner tube 3 of elastomeric material and around the tube a reinforcement of braided wire 2. The hose has an outer covering of elastomeric material 1.

To attach an end fitting to the hose a tubular slot is formed in the end of the hose by the following steps.

A tubular slit is formed in the hose as shown in FIGURE 1.

First a tubular metal sleeve 9 having the same external diameter as the internal diameter of the hose is slid a short way into the hose. A clip 7 of the Jubilee type is passed over the hose in the region of the sleeve and is tightened to clamp the metal sleeve 9 to the hose. The metal sleeve 9 has internal screw-threads 8.

A cutter 11 comprises a metal cylinder having along a part 20 of its length the same diameter as the bore of the hose. At either side of the central part there are two steps 21, 22 or sudden changes in diameter. At one step 21 the diameter decreases and the end portion 23 of the cylinder is screw threaded and the screw thread so formed makes screw threaded engagement with the screw-threads of the short metal sleeve 9. At the other step 22 or the cylinder there is a small decrease in diameter. At the outer end of the cylinder there is a third step 24 denoting an increase in diameter and a tubular cutting blade 6 extends, coaxially with the cylinder, from half way up the step 24. The blade 6 extends almost up to the step 22. At the extreme outer end of the cylinder there is a small hole 25 extending diametrically through the cylinder for the insertion of a tommy bar 4 to rotate the cylinder.

The cutter 11 is inserted into the hose with its screw threaded end 23 leading and the screw threaded portion mates with the screw threads 8 on the sleeve 9 which is already clamped inside the hose. The cutter 11 is rotated by means of the bar 4 and is gradually drawn into the hose by the screw threads, cutting a cylindrical slit 6 in the wall of the hose. The tubular blade is arranged to be at such a distance from the circumference of the cylinder that the slit 6 is formed within the thickness of the wall of the inner tube to divide the inner tube into two coaxial tubular parts. The cutter 11 is then withdrawn from the hose by rotation in the opposite direction.

It will be seen that the small decrease in diameter of the cylinder provided by the step 22 allows the inner part 26 to expand into the hose slightly to reduce friction in the cutting blade.

The next step is to enlarge the slit formed by the cutter into a slot for the reception of the end fitting, as shown in FIGURE 2.

The inner coaxial tubular part 26 (that is the part of the hose between the slit and the bore of the hose) is turned back inside the hose and is anchored into position by a cylindrical block 15. The block has an annular rib 13 to help to support the part 26. The layer of material between the slit 6 and the reinforcement 2 is cut away to bare the reinforcement on the inside of the hose. The block 15 is removed and the inner tubular part 26 is returned to its original position to form a tubular slot 16 between the inner tubular part 26 and the reinforcement 2.

The final step in the preparation of the hose is to remove the outer layer 1 to the length of the slot 16 to bare completely the reinforcement. The fully prepared hose is shown in FIGURE 3.

An end fitting 30 to be attached to the hose has a generally tubular shape and has, at its end to be attached to the hose, a tubular extension 31. The end fitting has the same bore 32 as the hose and the tubular extension has a slightly larger bore 33, the difference between the two bores being substantially the width of the inner tubular portion 26 of the hose. There is a small tubular projection 34 on the end of the extension and the outer surface of the extension has an annular ridge 35 mid-way in its length and a similar ridge 36 at its end remote from the end fitting. There is an annular rib 37 on the outer surface of the end fitting adjacent the extension.

To attach the end fitting to the hose a short tubular metal sleeve 38 is inserted into the end of the hose. This sleeve has the same external diameter 39 as the internal diameter of the hose and extends into the hose to just beyond the inner end of the slot. There is a small annular rib 40 on the outer end of the sleeve and this prevents the sleeve from sliding up into the hose.

The next step is to slide the tubular extension 31 of the end fitting into the slot 16 formed in the hose. The tubular projection 34 extends into the end of the slit 6 which is slightly longer than the slot 16. The step 42 formed by the change in diameter between the extension and the bore of the end fitting lies against the end of the sleeve 38 and the annular rib 40 thereon. The reinforcement 2 of the hose lies around the outside of the tubular extension 31 of the end fitting.

Next an outer tubular metal sleeve or ferrule 43 is slid over the end fitting and the hose. When the sleeve is in position it extends from the rib 37 on the end fitting to a position on the hose just beyond the end of the slit 6. There is an annular rib 44 on the inner surface of the sleeve 43.

The last step is to swage together the outer sleeve 43 the end fitting 30 and the inner sleeve 38. In this way the reinforcement 2 of the hose is gripped between the rib 44 on the outer sleeve 43 and the ridges 35 and 36 on the extension of the end fitting to secure the hose to the end fitting and the inner tubular part 26 of the hose is secured between the tubular extension 31 of the end fitting and the inner sleeve 38 to form a seal between the hose and the end fitting.

The method according to the invention is suitable for various forms of hose. For example the inner tube, which may be of synthetic rubber or flexible plastic may incorporate textile inter plies and/or embedded coiled wire. Further the cover layer 1 for the hose may be of any suitable material.

The method according to the invention is particularly useful in the preparation of hoses for use in refuelling boats at sea, for refuelling aircraft in flight or for towing.

I claim:
1. The method of preparing a hose embodying elastomeric material for the reception of an end fitting which method comprises forming a tubular slot in the end of the hose by the steps of forming a cylindrical slit in one end wall of the hose, which slit extends into the hose in the axial direction and divides the wall of the hose into inner and outer tubular parts, turning back inside the hose the inner tubular part, removing a layer of material from the inside of the outer tubular part and returning the inner part to its original position.

2. The method as claimed in claim 1 in which the hose comprises an inner tube of elastomeric material and around the tube a layer of braided or woven reinforcement and in which the slit is formed within the thickness of the wall of the inner tube to divide the hose into two coaxial tubular parts as aforesaid and in which the portion of the inner tube between the slit and the reinforcement is removed to produce the slot.

3. The method as claimed in claim 2 in which there is an outer layer of elastomeric material around the reinforcement.

4. The method as claimed in claim 1 in which the step of cutting the slit in the hose is accomplished by the use of a cutter which comprises a tubular cutting blade and, within the cutting blade and spaced inwardly therefrom, a cylindrical spigot extending towards the hose which spigot enters the hose ahead of the cutting blade and makes engagement with the inner wall of the hose.

5. The method as claimed in claim 1 in which the step of cutting the slit in the hose is accomplished by the use of a cutter having a cutting blade and in which a screw-threaded member is inserted into the bore of the hose and is clamped thereto, the cutter makes screw threaded engagement with the member to draw the cutter into the hose when the cutter is rotated and thereby to cut the slit.

6. The method as claimed in claim 1 and including the step of attaching to the hose an end fitting having a tubular extension which fits into the tubular slot, by clamping one part of the hose between the tubular extension and a metal sleeve.

7. The method as claimed in claim 6 in which there is an outer layer of elastomeric material around the reinforcement and in which the hose is attached to the end fitting by placing the extension of the end fitting in the slot, removing at least an end portion of the outer layer to expose the reinforcement, placing an outer tubular sleeve around the outside of the exposed reinforcement and at least a part of the end fitting and swaging the outer sleeve to the end fitting to grip the reinforcement against the fitting.

8. The method as claimed in claim 7 and including the step of inserting an inner sleeve into the hose within the inner part aforesaid and, by the swaging operation on the outer sleeve, also swaging the extension to grip the inner hose part against the inner sleeve.

References Cited
UNITED STATES PATENTS

| | | | |
|---|---|---|---|
| 2,463,293 | 3/1949 | Mentel | 285—149 |
| 2,752,674 | 7/1956 | Melsom | 29—508 |
| 2,795,041 | 6/1957 | Klinksiek | 29—508 |
| 2,797,111 | 6/1957 | Beazley | 285—149 |
| 2,797,474 | 7/1957 | Main | 29—506 |
| 2,920,910 | 1/1960 | Schnabel | 285—149 |
| 3,140,106 | 7/1964 | Thomas et al. | 285—149 |

CHARLIE T. MOON, *Primary Examiner.*

CARL W. TOMLIN, *Examiner.*